US007949935B2

(12) United States Patent
Friedman et al.

(10) Patent No.: US 7,949,935 B2
(45) Date of Patent: May 24, 2011

(54) SELECTING AND RENDERING A SECTION OF A WEB PAGE

(75) Inventors: Nancy Lynn Friedman, Apex, NC (US); Rick Allen Hamilton, II, Charlottesville, VA (US); Brian Marshall O'Connell, Cary, NC (US); Garfield Winston Vaughn, South Windsor, CT (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 11/741,155

(22) Filed: Apr. 27, 2007

(65) Prior Publication Data

US 2008/0270891 A1    Oct. 30, 2008

(51) Int. Cl.
*G06F 17/00* (2006.01)
(52) U.S. Cl. ........ 715/205; 715/206; 715/207; 715/208; 715/234; 715/241
(58) Field of Classification Search .......... 715/205–208, 715/241, 234
See application file for complete search history.

(56) References Cited

U.S. PATENT DOCUMENTS

| | | | | |
|---|---|---|---|---|
| 5,898,836 A * | 4/1999 | Freivald et al. | ............... | 709/218 |
| 5,982,370 A * | 11/1999 | Kamper | ................ | 715/760 |
| 5,983,245 A * | 11/1999 | Newman et al. | ............ | 715/205 |
| 6,182,140 B1 | 1/2001 | Feig et al. | | |
| 6,219,679 B1 * | 4/2001 | Brisebois et al. | ............. | 715/206 |
| 6,266,684 B1 * | 7/2001 | Kraus et al. | ................... | 715/209 |
| 6,567,848 B1 | 5/2003 | Kusuda et al. | | |
| 6,856,331 B2 | 2/2005 | Chang et al. | | |
| 7,120,664 B2 | 10/2006 | Sawa et al. | | |
| 7,124,093 B1 | 10/2006 | Graham et al. | | |
| 7,167,984 B2 | 1/2007 | Graveman | | |
| 2003/0025731 A1 * | 2/2003 | Chastain et al. | .............. | 345/764 |
| 2003/0074416 A1 | 4/2003 | Bates et al. | | |
| 2004/0205511 A1 | 10/2004 | Best et al. | | |
| 2005/0131992 A1 * | 6/2005 | Goldstein et al. | ............. | 709/202 |
| 2006/0041589 A1 | 2/2006 | Helfman et al. | | |
| 2006/0080432 A1 | 4/2006 | Spataro et al. | | |
| 2007/0299938 A1 * | 12/2007 | Chandra | ....................... | 709/219 |

OTHER PUBLICATIONS

U.S. Appl. No. 11/741,179, filed Apr. 27, 2007, Friedman et al.
Brush et al.,"Robustly Anchoring Annotations Using Keywords", Nov. 2001, Microsoft Research Technical Report, retrieved on Nov. 9, 2005, pp. 6, 17. http://research.microsoft.com/research/pubs/view.aspx?type=Technical%20Report&id=522.
"Web 2.0: Wizlite", pp. 1-5 retrieved Jul. 20, 2010 web2.econsultant.com/web2-wizlite.html.
"i-lighter", 1 page, retrieved Jul. 20, 2010 www.i-lighter.com/home/more_info.html.

(Continued)

*Primary Examiner* — Adam M Queler
(74) *Attorney, Agent, or Firm* — Yee & Associates, P.C.; Mark C. Vallone (57) ABSTRACT

A computer implemented method, apparatus, and computer usable program code for processing a web page. A selection of a section of text in a web page is received to form selected text. Identification information for the selected text is generated, wherein the identification information includes an identification of the selected text and a location of the selected text in the web page. The identification information is placed into a universal resource locator for the web page, wherein the universal resource locator is used to present the web page in a browser at the location.

32 Claims, 7 Drawing Sheets

OTHER PUBLICATIONS

Van Zanten, "Fleck—Save the best of the Web 1.2.2" pp. 1-5, retrieved Jul. 20, 2010 addons.mozilla.org/en-US/.../3908/.

"e-marked", 2004 Huyreka Solution, Germany, 1 page, retrieved Jul. 20, 2010 http://www.e-marked.com/index.php?

"About Diigo", pp. 1-4, retrieved Jul. 20, 2010 http://www.diigo.com/about.

USPTO Office Action for U.S. Appl. No. 11/741,179 dated Jul. 1, 2010.

"Wizlite", copyright in 2006, pp. 1-2, archived Feb. 10, 2007 by web.archive.org, available at: http://web.archive.org/web/20070210103147/http://wizlite.com/

"Fleck.com-Fleck the Web", pp. 1-2, archived Feb. 9, 2007 by web.archive.org. available at: http://web.archive.org/web/20070209204023/http://fleck.com/.

"Diigo Review", pp. 1-2, reviewed by Elsa Wenzel on Sep. 28, 2006. available at: http://reviews.cnet.com/online-software-services/diigo/4505-9239_7-32082352.htm?tag=rvwBody.

"i-Lighter", copyright in 2006, pp. 1-2, archived Feb. 8, 2007 by web.archive.org. available at: http://web.archive.org/web/20070208003819/www.i-lighter.com/HwItWrk.php.

Notice of Allowance for U.S. Appl. No. 11/741,179 dated Jan. 5, 2011.

* cited by examiner

SELECTING AND RENDERING A SECTION OF A WEB PAGE

CROSS REFERENCE TO RELATED APPLICATION

The present invention is related to the following patent application: entitled "Method and Apparatus for Selecting Advertising for a Web Page", Ser. No. 11/741,179, filed even date hereof, assigned to the same assignee, and incorporated herein by reference.

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for selecting and rendering a section of a web page.

2. Description of the Related Art

The Internet is a world-wide, publicly accessible network of interconnected computers that transmit data using a standard called Internet Protocol (IP). This network of computers allows any computer connected to the network to communicate with any other computer connected to the network. The Internet has provided different types of communications, such as e-mail, on-line chatting, file transfer, and web pages.

With respect to transferring data over the Internet, the world-wide web environment is used. This environment also is referred to simply as "the web". The web is a mechanism used to access information over the Internet. In the web environment, servers and clients exchange information using the hypertext transfer protocol (HTTP). This protocol is a known protocol for handling the transfer of various data files, such as text files, graphic images, animation files, audio files, and video files.

One commonly used construct to format data for presentation to a user is provided through a standard page description language called hypertext mark-up language (HTML). Documents using this type of language also are referred to as web pages. These pages may be static or dynamically created and are connected to each other through links also referred to as hyperlinks. These hyperlinks allow for a connection to other web resources to find the universal resource identifier (URI), such as a universal resource locator (URL).

A browser is a program used to view and interact with information on the Internet. A browser is able to display web pages and traverse links to other web pages. Resources, such as web pages, are retrieved by browsing. The browser submits a request for the resource in which the request typically includes an identifier, such as a universal resource locator. In this manner, a browser may navigate or view information or data in any distributed database, even outside of the Internet.

When a user retrieves and views a web page, the user may see or identify a subset or section of the web page that is of interest. The user may wish to alert another user of the particular section in the web page. Currently, this user sends the universal resource locator for the web page to the recipient along with instructions on where the section of interest is located in the web page. The user may include a set of instructions, such as, "see the second paragraph from the top", or "paragraph below the save money link".

This currently used method has several drawbacks. These drawbacks include the time spent generating the descriptive text by the sender, the time spent interpreting the descriptive text and locating the section within the web page by the recipient, and potential for miscommunication resulting in the recipient being directed to the wrong section of the web page.

Another currently used solution involves the user copying and pasting the relevant portions of the web page into another document and transmitting that document to the recipient. This method also has drawbacks, including the fact that the recipient may wish to read the other parts of the document to gain additional insight or contents on the section of the web page. The sender may include a link to the web page to provide this ability. A further drawback is that, depending on the nature of the material, copyright restrictions may make such practices illegal.

SUMMARY OF THE INVENTION

The illustrative embodiments provide a computer implemented method, apparatus, and computer usable program code for processing a web page. A selection of a section of text in a web page is received to form selected text. Identification information for the selected text is generated, wherein the identification information includes an identification of the selected text and a location of the selected text in the web page. The identification information is placed into a universal resource locator for the web page, wherein the universal resource locator is used to present the web page in a browser at the location.

A checksum is created for the selected text, wherein the checksum provides information for the location of the text in the web page. A determination may be made as to whether any text in the selected text is located within a frame and an identification of the frame in the identifier is included if any of the selected text is located within the frame. A set of text blocks may be identified containing the selected text, and a checksum may be created for each text block within the set of text blocks to form a set of checksums. A distance from a boundary of a text block to text in the selected text is identified and a number of characters that are present in the selected text located within the text block for each text block in the set of text blocks. A determination may be made as to whether any text in the selected text is located within a frame, and the frame is identified if any of the selected text is located within the frame. If the universal resource locator is selected to present the web page, the web page may be presented using the identification information in the universal resource locator.

A universal resource locator containing identification information for selected text in a web page may be received. In response, the web page may be retrieved to form a retrieved web page. Each text block may be identified within the retrieved web page that matches a checksum in a set of checksums contained in the identification information to form a set of identified text blocks. Selected text may be identified within the set of identified text blocks using the identification information, and the web page is presented at a location containing the selected text.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
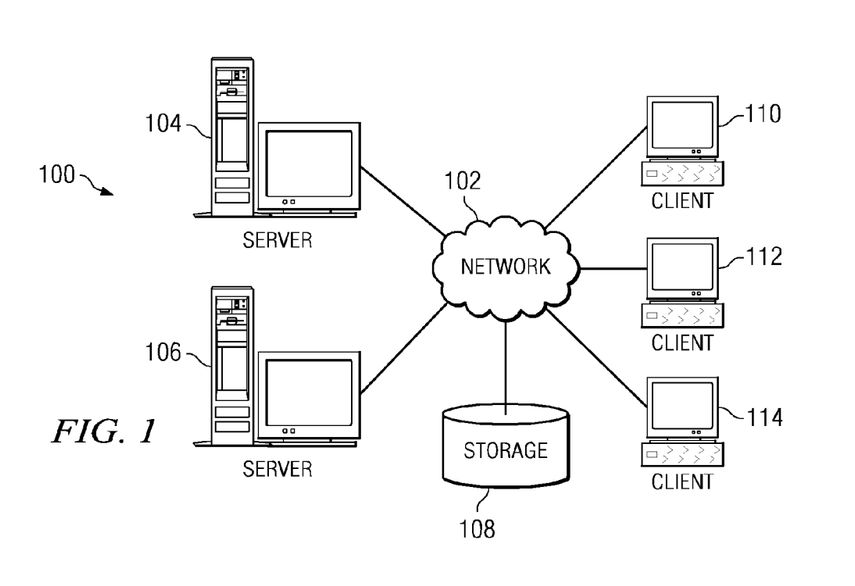
FIG. 1 is a pictorial representation of a network of data processing systems in which illustrative embodiments may be implemented.
Figure 2:
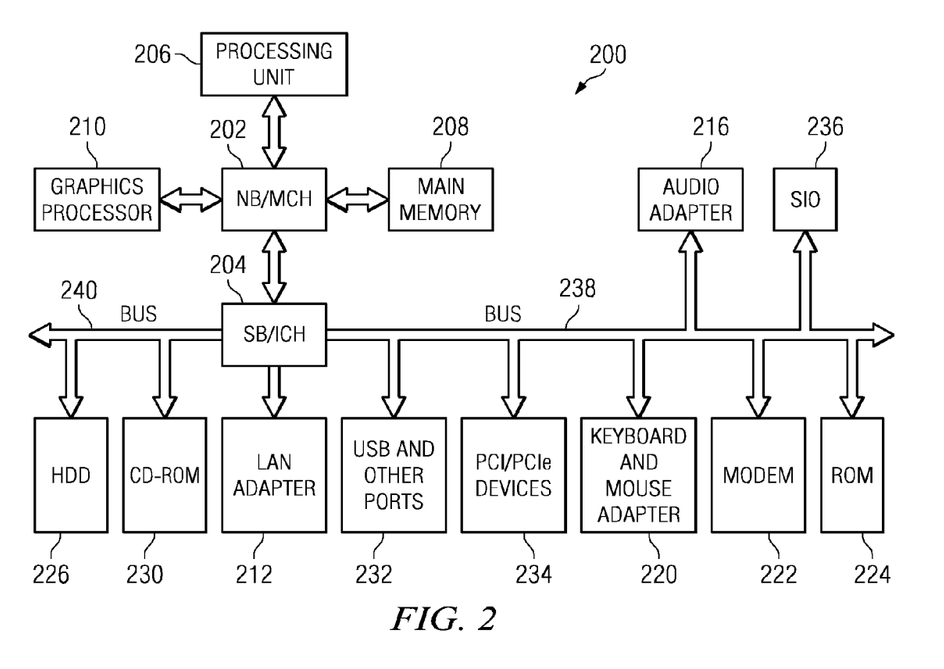
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for processing a web page. In response to receiving a selection of text in a web page, identification information is generated for the selected text. This identification information includes, for example, an identification of the selected text. The identification information also may include the location of the selected text in the web page. This identification information is placed into a universal resource locator for the web page. This universal resource locator may then be used to present the web page in a browser at that location.

In this manner, the different embodiments allow a user to generate a universal resource locator for a subset of a web page. This universal resource locator can be shared by other users to automatically navigate to that section of the web page. In the illustrative examples, a checksum system is used to ensure that the universal resource locator describes the appropriate section of content. In this manner, the appropriate section may be identified even when other parts of the web page are modified. In these examples, the text in the selected section also may be associated with a graphical indicator to ensure that the recipient can locate and see the selected section. This graphical indicator may be, for example, highlighting, changing the color of the text, or associating a graphical image with the section of text.

Figure 3:
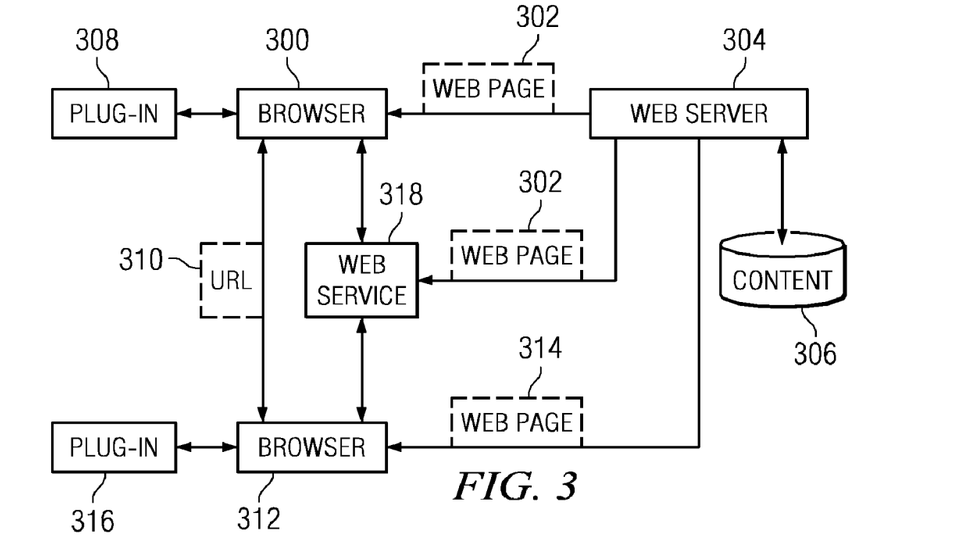
FIG. 3 is a diagram illustrating components used to generate and present web pages in accordance with an illustrative embodiment.

Turning now to FIG. 3, a diagram illustrating components used to generate and present web pages is depicted in accordance with an illustrative embodiment. In this example, a user and browser 300 may retrieve web page 302 from web server 304. Web page 302 may be a static web page or a dynamically generated web page using content 306. A section of web page 302 may be selected by the user for generation of a universal resource locator containing information needed to identify the selected section. The processes for generating the universal resource locator may be made using processes within browser 300 or plug-in 308. A plug-in is an auxiliary program or process that works with another program to enhance the capability of that program. For example, plug-ins are widely used in browsers to support the types of content, such as audio and video. In this example, the processes used to generate a universal resource locator with additional information may be implemented within plug-in 308. The additional information may include, for example, position, relative position, object identification, and/or an offset of the selected area within the object.

This universal resource locator may be transmitted as universal resource locator (URL) 310 to browser 312 for use in presenting a web page identified by universal resource locator 310. Universal resource locator 310 may be transmitted in a number of different ways, such as, through e-mail, instant messaging, or in a document to a user for use in browser 312. Upon receiving the universal resource locator for use in retrieving a web page, browser 310 retrieves web page 314 from web server 304. In this example, web page 302 and web page 314 may be identical web pages. In some embodiments, web page 314 may be a modified version of web page 302.

Browser 312 through processes located within browser 312 or by using plug-in 316 may then identify the selected section of text using the information within universal resource locator 310. Browser 312 then presents web page 314 at the location where the selected text is present in these examples.

Further, browser 312 may present a graphical indicator in association with the selected section. As mentioned above, this graphical indicator may be highlighting, changing the color of the text, or associating a graphical image with the selection of text identified through universal resource locator 310.

Depending on the particular embodiment, if browser 312 does not include the processes necessary to identify the selected section of text in web page 314, browser 312 may contact web service 318 to process web page 314 to identify the selected section and generate the graphical indicator for presentation by browser 312. In this embodiment, browser 312 does not retrieve web page 314. Instead, browser 312 sends the additional information within universal resource locator 310 to web service 318. In turn, web service 318 retrieves web page 314 for processing. Web service 318 may be located at a different data processing system or the same data processing system as web server 304 depending on the implementation. In these illustrative examples, the universal resource locator generated with the additional information includes a universal resource locator to web service 318. If a plug-in is present to process the additional information to the web page, the universal resource locator to web service 318 is ignored.

In yet another embodiment, neither browser 300 or browser 312 may have the appropriate processes in plug-in 308 and plug-in 316 to process the web page to generate the additional information for universal resource locator 310 and to process that additional information when displaying the web page. In this particular embodiment, browser 300 may contact web service 318 to generate universal resource locator 310. In this type of embodiment, web page 302 is retrieved by web service 318. In turn, web service 318 displays a page within a frame with the appropriate processes to allow the user at browser 300 to select different sections of text. Upon completion of this process, web service 318 generates universal resource locator 310 and may send it back to browser 300 for the user to send to another user. Alternatively, web service 318 may directly send universal resource locator 310 to browser 312 for presentation.

Further, the different illustrative embodiments allow for an ability to present the selected text even if the page layout changes or the section of interest is not relocated within the page. In these illustrative examples, this feature is provided though generating a checksum for the selected text of interest.

Another feature in the illustrative embodiments involves adding advertisements or other information based on the sections of text selected in a web page, such as web page 302 or web page 304. In the different illustrative embodiments, the text in the selected sections may be used to identify an advertisement to be included or added to the web page. A selection of these advertisements may be used through various known methods to match relevant advertisements to content in the selected text. In these illustrative embodiments, the advertisements are matched to a subset of the text as selected by the user.

Information on a web page that is not part of the selected text is ignored for advertising purposes in these examples. The advertisements may take different forms, such as text or a banner. These advertisements may be placed in different locations in the web page or even within the content as word links that show advertising when a pointer moves over the link. These words may be key words derived from the selected text and may be words within the selected text, such that the advertisement is part of the selected text. Any type of advertisement may be used with the different embodiments.

Additionally, if a web page already has built in advertising space, the advertisements placed in those spaces may be selected based on the selected text in the web page. This addition of advertisements to a web page may be implemented in a web service, such as web service 318, in a plug-in, such as plug-in 316, or in a browser, such as browser 312. For example, if the selected text includes the term "microprocessor" or "processor" multiple times, an advertisement, such as that for a personal computer may be included in the web page.

Further, in some cases, the amount of selected text may be small enough that advertisements can not be efficiently generated on the amount of text selected. In other words, not enough advertisements may be identified or the number of advertisements cannot be narrowed down efficiently. In this case, the different embodiments may use additional text, such as text near or surrounding the selected text to obtain content for identifying advertisements. Additionally, these ads also may be targeted based on a top level domain, such as .gov, .com, and .edu, for the web page.

Figure 4:
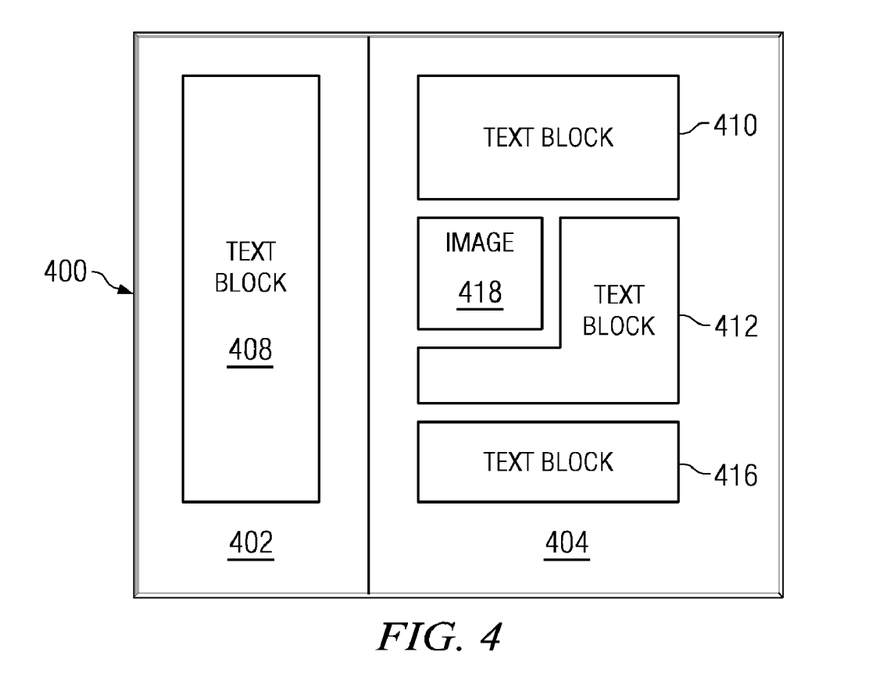
FIG. 4 is a portion of a web page in accordance with an illustrative embodiment.

Turning now to FIG. 4, a portion of a web page is depicted in accordance with an illustrative embodiment. In this example, web page 400 is an example of a web page displayed by a browser, such as browser 300 in FIG. 3. Web page 400 is displayed using frame 402 and frame 404. Frame 402 contains text block 408, which may be, for example, a menu. Frame 404 contains text blocks 410, 412, and 416. Additionally, frame 404 also includes image 418. In this example, only a portion of web page 400 can be display within the browser.

Figure 5:
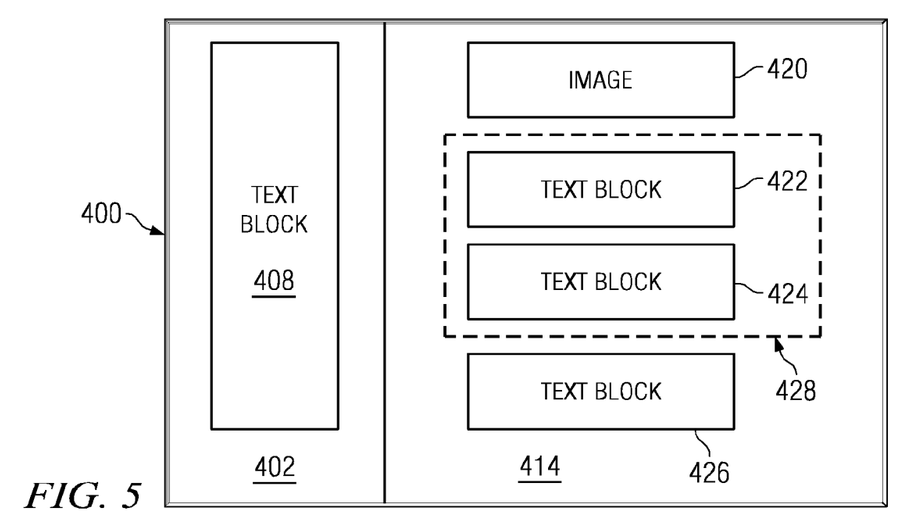
FIG. 5 is another portion of the web page in accordance with an illustrative embodiment.

Turning now to FIG. 5, another portion of the web page is depicted in accordance with an illustrative embodiment. In this example, a different portion of web page 400 in FIG. 4 is displayed in FIG. 5. Image 420 is displayed along with text blocks 422, 424, and 426. In this illustrative example, a user selects text blocks 422 and 424 within dotted line 428 as text of interest to form selected text. In these examples, identification information is generated from the selected text within dotted line 428 to generate a universal resource locator containing information about the text selected by the user.

In these examples, the entirety of web page 400 cannot be displayed in the browser in these examples. As a result, the user scrolls or repositions web page 400 to see the content illustrated in FIG. 5.

Figure 6:
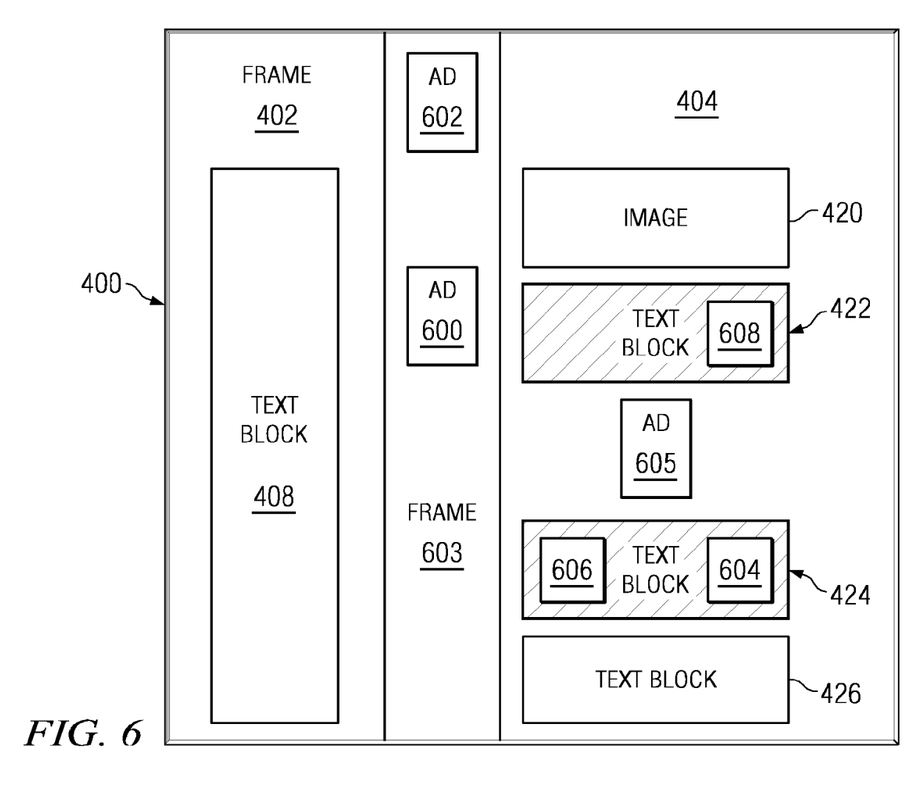
FIG. 6 is illustration of a web page presented using identification information in accordance with an illustrative embodiment.

Turning now to FIG. 6, an illustration of a web page presented using identification information is depicted in accordance with an illustrative embodiment. In this example, the user retrieves web page 400 and a browser, such as browser 312 in FIG. 3. The browser recognizes that the universal resource locator includes identification information for the selected text in web page 400. The browser may then use processes to identify text block 422 and text block 424 in web page 400 and present web page 400 at that location to the user. In this manner, the user is not initially presented web page 400 as shown in FIG. 4. Instead, the web page is presented at the location containing text blocks 422 and 424. Further, in these examples, text blocks 422 and 424 are associated with a graphical indicator, such a highlighting, which is indicated by the cross-hatching in these text blocks.

In this manner, the user receiving the universal resource locator may have their attention quickly pointed to the appropriate section of text. In these examples, the processes used to identify the selected sections of text from the identification information in the universal resource locator may be located in the browser.

Alternatively, the processes may be found in other components, such as, the plug-in for the browser or in a web service that may be contacted by the browser. In these examples, a web service is a program or application that may be accessed over a network, such as the Internet in which a software application is executed on a remote system hosting the requested services.

In addition, web page 400 also may include advertisements, such as ad 600 and ad 602. These advertisements are generated and placed in to web page 400 based on the content in text blocks 422 and 424 in these examples. As depicted in the illustrative embodiment, a new frame, frame 603, is generated for web page 400 to contain ads 600 and 602. The selected advertisement also may be placed in existing space in web page 400. Ad 605 is an example of an advertisement selected using the selected text in text blocks 402 and 424. Ad 605 in this example is placed in an existing advertisement spot in web page 400.

The existing advertisement spot is selected in these examples as having a location that is close to or nearby the selected text. In this type of embodiment, the spot is selected as one in which the advertisement will be visible when the selected text is visible. The advertising selection and the generating of selected text are two processes that are linked to each other in these depicted examples. Further, the advertising service may not be the same service as the one that generates the selected text.

Of course, the manner in which advertisements are generated and placed within web page 400 may differ depending on a particular implementation. Another example includes key words 604, 606, and 608 located within text blocks 422 and 424. Each of these key words is selected such that when a pointer hovers over the key word, an advertisement may pop open a balloon. For example, if a key word is "automobile", an advertisement for a particular brand or type of car may pop up when a user moves a pointer over one of these key words. The user may then select the key word to retrieve a web page or obtain more information. These advertisements are added to web page 400 when web page 400 is processed by a browser, a plug-in for the browser, or a web service.

In this manner, advertising may be targeted based on the content selected as being content of interest in text blocks 422 and 424. Other content within web page 400 is ignored in identifying advertisements of interest in these depicted examples. Thus, if text blocks 422 and 424 are directed towards sports while other text blocks within web page 400 are directed towards other subjects, the advertisements identified for use in web page 400 may be related to sports. Further, some embodiments also may further target ads based on the top level domain in the universal resource locator for web page 400.

Figure 7:
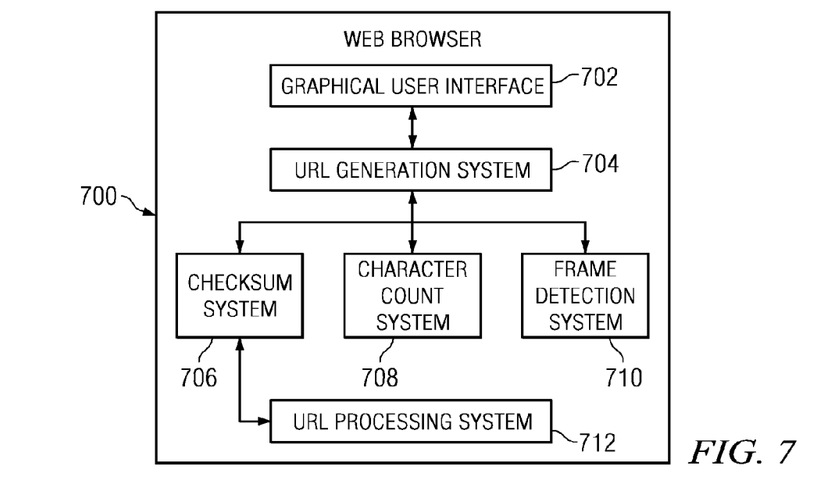
FIG. 7 is diagram of components used to generate a universal resource locator containing identification information in accordance with an illustrative embodiment.

Turning now to FIG. 7, a diagram of components used to generate a universal resource locator containing identification information is depicted in accordance with an illustrative embodiment. In this example, web browser 700 contains graphical user interface 702, universal resource locator (URL) generation system 704, checksum system 706, character count system 708, frame detection system 710 and universal resource locator processing system 712.

These components, are components within web browser 700 used to generate universal resource locator with identification information for a selected section of text in these examples. Web browser 700 is an example of a web browser, such as web browser 300 in FIG. 3. In these examples, web browser 700 may be implemented using a browser application, such as Microsoft Internet Explorer. Microsoft Internet Explorer is available from Microsoft Corporation.

Graphical user interface 702 is a component within browser 700 that allows a user to interact with web browser 700. In this manner, a user is able to navigate between pages, select text, and initiate a wide range of interactions with web browser 700. In these illustrative examples, graphical user interface 702 allows a user to select one or more regions of text simultaneously and to initiate generation of a universal resource locator containing identification information on the selected blocks of text. This universal resource locator is used to direct recipients to the selected sections of text in the web page.

Universal resource location generation system 704 is a component used to create a universal resource locator with the identification information. Universal resource location generation system 704 receives the location of the selected text from graphical user interface 702. Universal resource location generation system 704 interacts with checksum system 706, character count system 708, and frame detection system 710 to generate the universal resource locator with identification information for the selected text. If more than one section of text is selected, all of that information is placed into a single universal resource locator in these examples.

Checksum system 706 generates a checksum for each text block containing the selected text. In these examples, a text block is text that has block boundaries, which is a markup in the web page used to separate one section of text from another. Examples of a block boundary in hypertext markup language include, for example, <pre>, <p>, or <br>. Once the boundaries for the selected text have been established, text blocks may be identified. In these illustrative embodiments, each text block is used as a data source to generate a unique identifier for that text block. In these examples, the unique identifier is generated through a checksum process. Checksum processes include, for example, Fletcher's checksum, Adler-32, and CRC32. Checksums generated by checksum system 706 are used by a browser receiving the universal resource locator containing this information to locate the text block corresponding to the unique identifier.

Character count system 708 is used to define the boundaries for the selected text relative to the start and end of a text block. Processes similar to those used in checksum system 706 may be used to locate the start of the text block. From this information, character count system 708 generates two integer values in these illustrative examples. One value is the distance from the start of the text block until the start of the selected text region. Another value, in these illustrative embodiments, is the number of characters selected. Based on the number of characters selected, the ending of the selected text within a text block may be identified.

Frame detection system 710 is used to determine whether any of the selected text is located within a frame. If any of the selected text is present in a frame, the name of the frame is returned to universal resource locator generation system 704 for use in the identification of information for the universal resource locator.

These components in web browser 700 also may be used to process a universal resource locator containing additional information. For example, a user may select a universal resource locator or enter a universal resource locator through graphical user interface 702. Universal resource locator generation system 704 may determine whether additional information is present in the universal resource locator received from graphical user interface 702.

In response, universal resource locator processing system 712 identifies text blocks within the web page. Universal resource locator processing system 712 uses checksum system 706 to generate a checksum for each of the text blocks identified in the web page.

Thereafter, universal resource locator processing system 712 compares the generated checksum with a set of check sums identified in the additional information of the universal resource locator. A set of checksums is a set of one or more checksums. Each checksum in the set of checksums is a unique identifier identifying the text block containing selected text of interest.

If a match is present, universal processing system 712 then uses the location of the start of the selected text as well as the length of the selected text to associate a graphical indicator with the selected text in each text block having a checksum matching a checksum in the set of checksums. In these depicted examples, the graphical indicator that is associated with the selected text is highlighting. Of course, other graphic indicators may be used. For example, the text may be presented a selected color, the text may be bolded, the text may be presented using a selected font type, the text may be presented using a selected font size, and the text may be presented in association with a graphical image or bitmap. Additionally, any combination of these or other types of graphic indicators may be used depending on the implementation.

Additionally, in these illustrative examples, a match between the checksum generated for a text block in the web page and the checksum in the additional information in the universal resource locator may be present even though the values may not be the same. If the difference in the values is within the threshold, a match also may be present in these examples. Thus, if some modification of the text block containing the selected text occurs, a match may still be present if the modification has not undergone more than some acceptable amount of change. This type of checksum comparison may be implemented in a number of different ways. For example, this type of checksum comparison may be implemented using the processes in U.S. Pat. No. 7,167,984.

After all of the text blocks in the web page have been processed, and the selected text has been identified and associated with a graphical indicator, universal resource locator processing system 712 then provides the information to other components of web browser 700 to present the web page at a location containing the first selected text box containing the selected text in association with a graphical indicator.

The depiction of the different components used to generate universal resource locators with additional information and to process those universal resource locators are presented for purposes of showing different logical functions and are not meant to limit the manner in which these different functions may be implemented. For example, two or more of these functions may be implemented as a single component rather than in the different components illustrated within web browser 700.

Figure 8:
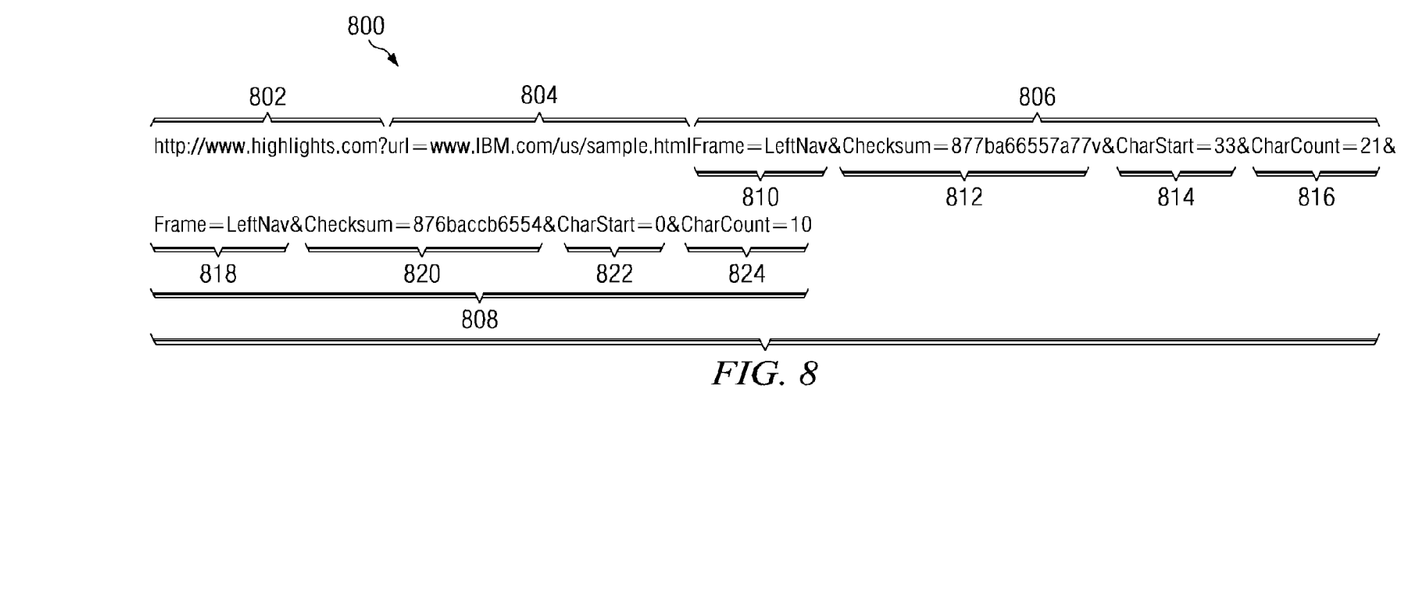
FIG. 8 is a diagram illustrating a universal resource locator with identification information in accordance with an illustrative embodiment.

Turning now to FIG. 8, a diagram illustrating a universal resource locator with identification information is depicted in accordance with an illustrative embodiment. In this example, universal resource locator 800 is an example of a universal resource locator containing identification information about selected text in a web page. Section 802 contains a universal read locator pointing to a web service, such as web service 318 in FIG. 3. This web service provides processes needed to identify the selected sections of text and associated graphical indicator with those selected sections of text in the web page identified in section 804. Section 804 is the universal resource locator to the web page containing the selected text in these examples. Section 806 contains the universal resource locator to the web page. Section 806 contains identification information for selected text in one text block and section 808 contains identification information for selected text in another text block. Section 806 contains frame identifier 810, checksum 812, character start 814, and character count 816. In a similar fashion, section 808 contains frame identifier 818, checksum 820, character start 822, and character count 824.

Figure 9:
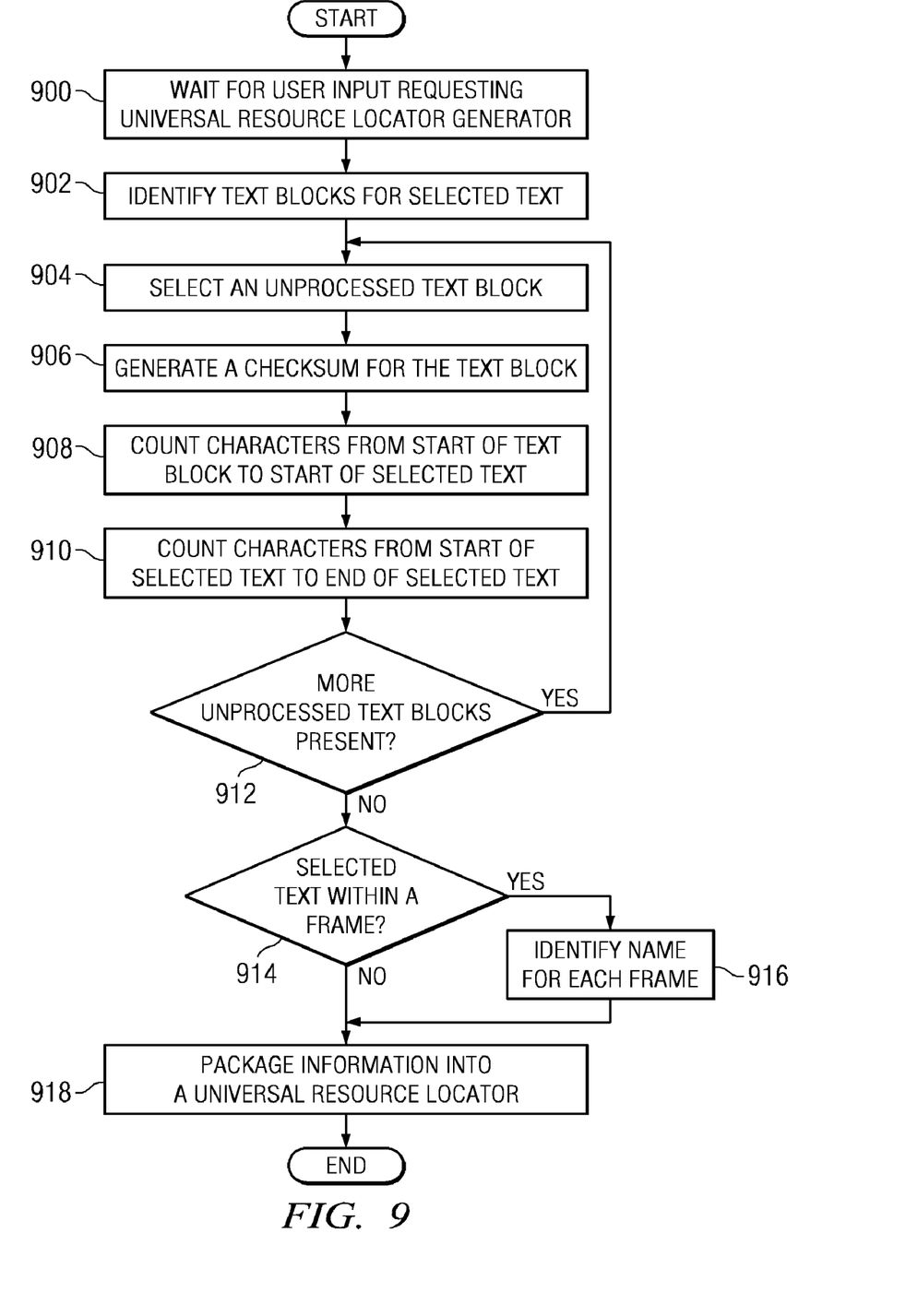
FIG. 9 is a flowchart of a process for generating a universal resource locator with additional information in accordance with an illustrative embodiment.

Turning now to FIG. 9, a flowchart of a process for generating a universal resource locator with additional information is depicted in accordance with an illustrative embodiment. The process illustrated in FIG. 9 may be implemented in a software component, such as browser 300 in FIG. 3. Alternatively, these processes also may be implemented using a web service, such as web service 318 in FIG. 3.

The process begins by waiting for user input requesting the generation of a universal resource locator (step 900). This user input includes a selection of text within a web page. In these examples, the user input also includes the initiation of a command to generate the universal resource locator.

Next, text blocks are identified for the selected text (step 902). In these examples, step 902 is performed by detecting the text boundaries for the selected regions of text. A text block boundary is any markup that separates one section from another section of text. For example, with a web page written in hypertext markup language, a text block boundary may be, for example, <pre> or <p>. The text between these different boundaries are considered text blocks in these examples.

Thereafter, an unprocessed text block is selected from the text blocks that have been identified (step 904). A checksum is then generated from the text block (step 906). In step 906, the checksum is generated or created using all of the text within the text block. This checksum forms a unique identifier for the text block.

The characters from the start of the text block to the start of the selected text are then counted (step 908). This step is used to identify where selected text may begin within a text block. For example, all of the text, or only a portion of the text in a text block, may be selected text designated by the under input. The count of characters may be used as an offset in the information generated for the universal resource locator. Then, the characters from the start of the selected text to the end of the selected text within the text block is counted (step 910).

Next, a determination is made as to whether additional unprocessed text blocks are present (step 912). If additional unprocessed text blocks are present, the process returns to step 904 to select another unprocessed text block for processing. Otherwise, a determination is made as to whether any of the selected text is located within a frame (step 914).

If selected text is present within a frame, the name of each frame in which selected text is present is identified (step 916). The information is then packaged or placed into a universal resource locator (step 918) with the process terminating thereafter. This information packaged into the universal resource locator in step 918 is the additional information in these examples. With reference again to step 914, if selected text is not present within a frame, the process proceeds to step 918 as described above.

Figure 10:
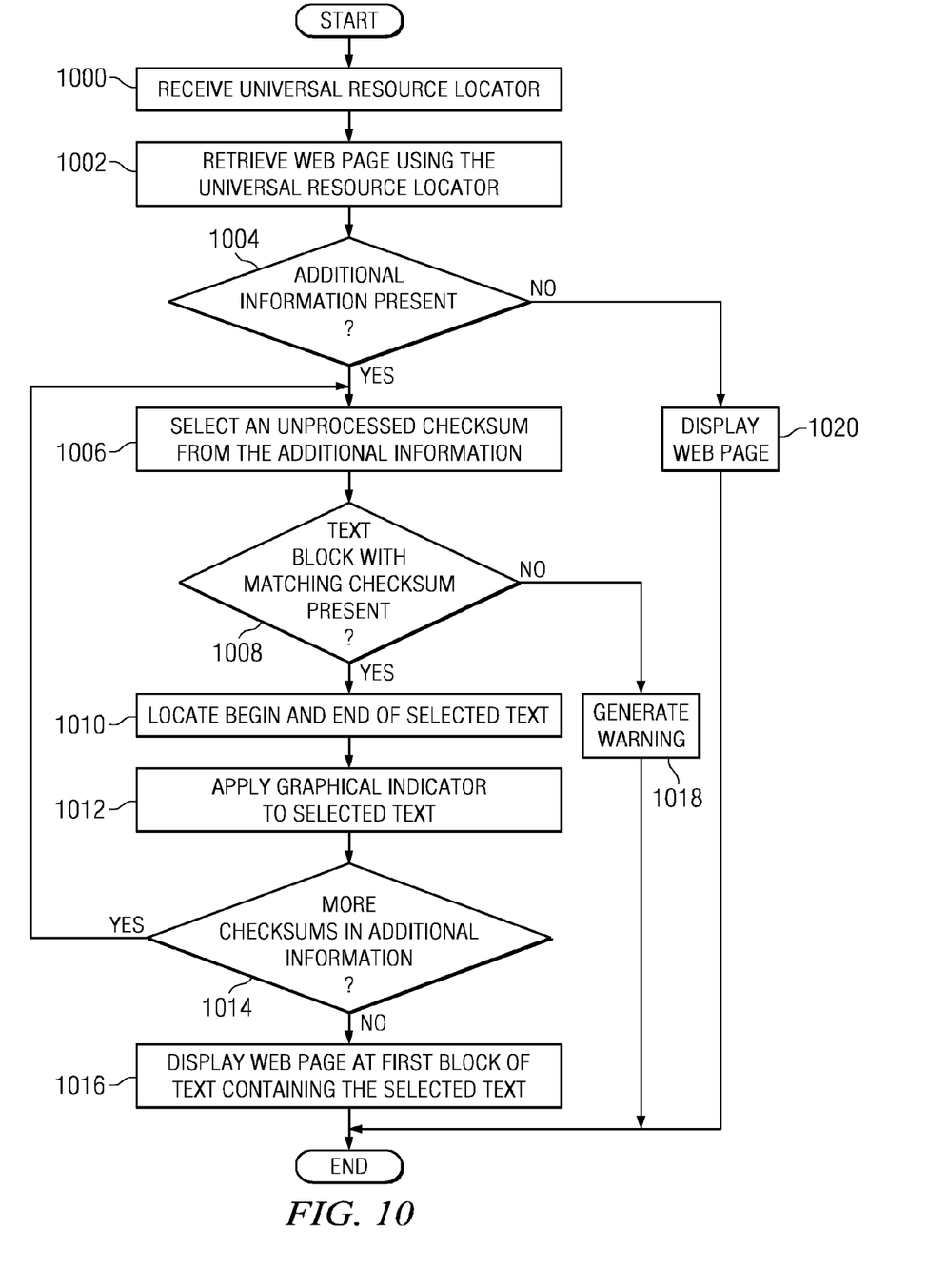
FIG. 10 is a flowchart of a process for processing a universal resource locator in accordance with an illustrative embodiment.

Turning now to FIG. 10, a flowchart of a process for processing a universal resource locator is depicted in accordance with an illustrative embodiment. The process illustrated in FIG. 10 may be implemented in a software component, such as browser 300, plug-in 308, or web service 318 in FIG. 3.

The process begins by receiving a universal resource locator (step 1000). The web page is then retrieved using the universal resource locator (step 1002). A determination is made as to whether additional information is present in the universal resource locator (step 1004). If additional information is present, an unprocessed checksum is selected from the additional information (step 1006). The universal resource locator may include more than one checksum identifying more than one text block within the web page.

Thereafter, a determination is made as to whether a text block with a matching checksum is present (step 1008). In these examples, the determination in step 1008 is made by generating a checksum for the text block and determining whether that checksum matches the one selected from the universal resource locator. Further, a match may be an exact match between the value for the checksum of the text block and the value of the checksum in the universal resource locator. In other embodiments, a match also may occur if any differences in the checksums are within a selected threshold level.

If the text block in step 1008 has a matching checksum, the beginning and the end of the selected text within the text block is located (step 1010). The beginning and the end of the selected text within a text block may be identified using information from the universal resource locator. In the depicted examples, the identification information in universal resource locator includes the start of the selected text as well as a character count of the number of characters in the selected text within the text block.

Next, a graphical indicator is applied to the selected text (step 1012). In these examples, the graphical indicator is a highlighting of the selected text. Of course, any other type graphic indicator may be used depending on the particular implementation. For example, the text may be bolded, presented in a different color, presented using a different font size or font type, or associating a graphical bitmap or image to be presented in association with the selected text.

Then, a determination is made as to whether more checksums are present in the additional information (step 1014). If additional check sums are not present, the process displays the web page at the first block of text containing the selected text (step 1016) with the process terminating thereafter.

With reference again to step 1014, if more checksums are present in the additional information, the process returns to step 1006 as discussed above. With reference again to step 1008, if a text block with a checksum matching the checksum in the additional information is not present, a warning is generated (step 1018). The process then terminates.

Turning back to step 1004, if additional information is not present, the process displays the web page (step 1020) with the process terminating thereafter.

Figure 11:
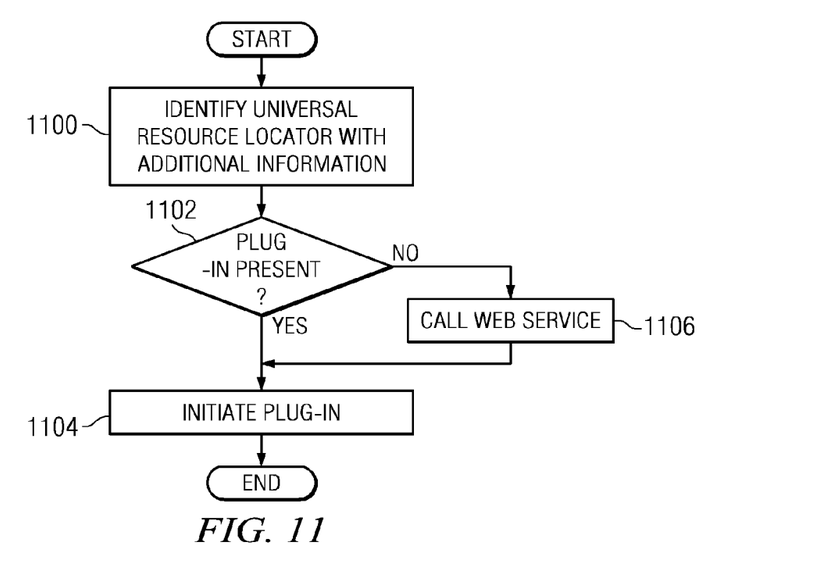
FIG. 11 is a flowchart of a process for processing universal resource locator containing additional information in accordance with an illustrative embodiment.

Turning now to FIG. 11, a flowchart of a process for processing universal resource locator containing additional information is depicted in accordance with an illustrative embodiment. The process illustrated in FIG. 11 may be implemented in a software component, such as browser 300 in FIG. 3.

The process begins by identifying a universal resource locator with additional information (step 1100). A determination is made as to whether a plug-in is present to process the additional information (step 1102). If a plug-in is present, the plug-in is initiated to process the universal resource locator and additional information (step 1104) with the process terminating thereafter. In these examples, the plug-in may implement processes, such as those illustrated in FIG. 10.

With reference again to step 1102, if a plug-in is not present, a call is made to a web service to process the universal resource locator and the additional information (step 1106) with the process terminating thereafter. In this case, a web server at a remote data processing system performs the different processes illustrated in FIG. 10 and returns a web page with the appropriate graphical indicator and information that may be needed to present the web page at the location of the selected text.

Figure 12:
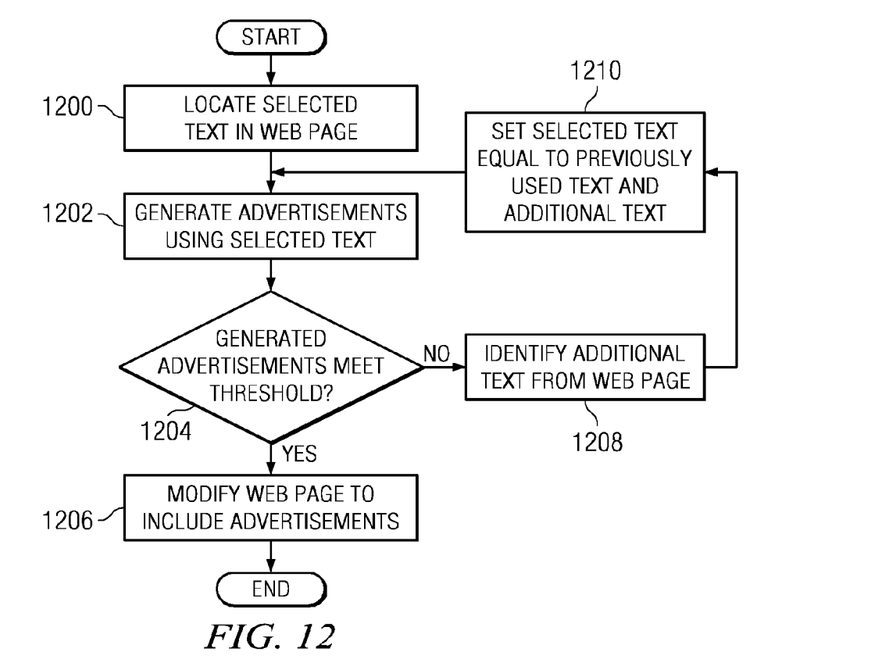
FIG. 12 is a flowchart of a process for identifying advertisements for a web page in accordance with an illustrative embodiment.

Turning now to FIG. 12, a flowchart of a process for identifying advertisements for a web page is depicted in accordance with an illustrative embodiment. The process depicted in FIG. 12 may be implemented in different components, depending on the particular implementation. For example, these processes may be implemented in a software component, such as browser 300, plug-in 308, or web service 318 in FIG. 3. This process begins after the web page has been processed to identify and associate a graphical indicator with selected text, such as the process illustrated in FIG. 10.

The process beings by locating selected text in a web page (step 1200). The identification in step 1200 is made using the web page processed in the flowchart in FIG. 10, in which the selected text has been identified. Thereafter, advertisements are generated using the selected text (step 1202). Step 1202 may be implemented using any known process for generating or identifying advertisements based on content. The different embodiments, in these examples, target or select the advertisements based on the text selected in the web page, rather then all the content in the web page or based on user information. For example, the selected text in the web page may be processed using key word targeting. Key word targeting identifies key words within content and associates or selects ads based on the key words in a key word search. The different illustrative embodiments may use this type of process to identify advertisements based on words within the selected text. Any known method or system for selecting advertisements based on content may be used to implement step 1202.

Thereafter, a determination is made as to whether the advertisements generated meet a threshold (step 1204). In some cases, the amount of selected text may be small enough that advertisements can not be identified or a desired number of advertisements can not be identified for the web page. If the generated advertisements meet the threshold, the web page is modified to include the advertisements (step 1206), with the process terminating thereafter.

With reference again to step 1204, if the number of generated advertisements do not meet the threshold, additional text is identified from the web page (step 1208). This additional text may be additional text within a text block containing the selected text. If that amount of text is still insufficient, the additional text may be in other text blocks. These other text blocks may be, for example, text blocks located before or after the text block or blocks containing the selected text. For example, a sentence or sentences before or after the selected text may be identified as additional text. Thereafter, the selected text and the additional identified text are set equal to the previously used text for generating ads (step 1210) with the process then returning to step 1202 to generate advertisements using the selected text.

Thus, the different illustrative embodiments provide a computer implemented method, apparatus, and computer usable program code for processing a web page. A selection of a section of text in a web page is received to form selected text. Identification information is generated for the selected text. This identification information includes identification of the selected text and the location of the selected text in the web page. The identification information is placed into a universal resource locator for the web page. This universal resource locator is used to present the web page in the browser at the location of the selected text.

The different embodiments may be applicable to changes in layout or repositioning of text blocks containing the selected text to other locations in the web page. In these illustrative examples, unique identifier is generated for the selected text that may be used to identify where the selected text is in the web page regardless of changes to the layout or location of text blocks. In these examples, the checksum is used to provide the unique identifier.

Thus, the different embodiments provide an ability to enhance and accelerate the process in which a user designates and presents selected text in a web page to another user at another web browser. The different embodiments allow for a user to be directed to specific sections of a web page by entering or selecting the universal resource locator containing the identification of the selected sections. Further, changes in page layout or relocation of the selected text within the web page does not change or make invalid the universal resource locator with additional information generated in these embodiments. These types of changes in layout or relocation of text blocks may often occur in web pages generated from dynamic content in which content, such as advertisements, may change.

The invention can take the form of an entirely hardware embodiment, an entirely software embodiment or an embodiment containing both hardware and software elements. In a preferred embodiment, the invention is implemented in software, which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing a web page, the method comprising:
    a computer receiving, a selection of a section of text in the web page to form selected text;
    the computer identifying, a set of text blocks in the web page containing the selected text;
    the computer identifying, for each text block in the set of text blocks containing at least a portion of the selected text, block boundaries of the text block that separate two or more sections of text within the web page, a distance from a block boundary of the text block to text in the selected text, and a number of characters that are present in the selected text located within the text block;
    the computer generating identification information for the selected text, wherein the identification information includes: an identification of the selected text, a location of the selected text in the web page; and, for each text block in the set of text blocks containing the at least a portion of the selected text, the distance from a block boundary of the text block to text in the selected text and the number of characters that are present in the at least a portion of the selected text within the text block; and
    the computer placing the identification information into a universal resource locator for presenting the web page in a browser at the location of the selected text.

2. The method of claim 1, wherein the computer generating the identification information for the selected text comprises:
    the computer creating a checksum for the selected text, wherein the checksum provides information for the location of the selected text in the web page.

3. The method of claim 1, wherein the computer generating the identification information for the selected text comprises:
    the computer determining whether any text in the selected text is located within a frame; and
    the computer including an identification of the frame in the identification information if the any text is located within the frame.

4. The method of claim 1, wherein the computer generating the identification information for the selected text comprises:
    the computer creating a checksum for each text block in the set of text blocks containing the at least a portion of the selected text to a form set of checksums, wherein the set of checksums provides information to locate each text block in the set of text blocks within the web; and
    the computer including the set of checksums in the identification information for the selected text.

5. The method of claim 4, wherein the computer generating the identification information for the selected text further comprises:
    the computer determining whether any text in the selected text is located within a frame; and
    the computer identifying the frame if the any text is located within the frame.

6. The method of claim 4, further comprising:
    the computer, responsive to user input selecting the universal resource locator to present the web page, presenting the web page at the location containing the selected text using the set of checksums to uniquely identify a location of each text block in the set of text blocks containing the at least a portion of the selected text in the web page.

7. The method of claim 6, wherein presenting the web page at the location containing the selected text using the set of checksums to uniquely identify the location of each text block in the set of text blocks containing the at least a portion of the selected text in the web page comprises:
    the computer identifying every text block within the web page that matches a particular checksum in the set of checksums contained in the identification information to form a set of identified text blocks;
    the computer identifying the selected text within the set of identified text blocks using the identification information; and
    the computer presenting the web page at the location containing the selected text.

8. The method of claim 7, wherein presenting the web page at the location containing the selected text using the set of checksums to uniquely identify the location of each text block in the set of text blocks containing the at least a portion of the selected text in the web page further comprises:
    the computer determining whether a text block within the web page matches the particular checksum in the set of checksums such that any differences are within a selected threshold level;
    if a match is present, the computer identifying the selected text within the text block; and
    the computer generating a notification that a modification has occurred in the text block.

9. A method for processing a universal resource locator, the method comprising:
    a computer, responsive to receiving a universal resource locator containing identification information for selected text in a web page, retrieving the web page to form a retrieved web page;
    the computer identifying a set of text blocks and a location of each text block in the set of text blocks within the retrieved web page that matches a checksum in a set of checksums contained in the identification information to form a set of identified text blocks, wherein each text block in the set of text blocks is text that has block boundaries in a web page, and wherein block boundaries are a markup in a web page to separate one section of text from another section of text;
    the computer identifying selected text within the set of identified text blocks using a distance from a boundary of a text block within the set of identified text blocks to text within the selected text and a number of characters in the text block within the selected text, wherein the distance and the number of characters are contained in the identification information; and the computer presenting the web page at the location containing the selected text.

10. The method of claim 9, wherein the computer presenting the web page at the location containing the selected text comprises:

the computer presenting the selected text in association with an indicator.

11. The method of claim 10, wherein the computer presenting the selected text in association with the indicator comprises:

the computer highlighting the selected text.

12. The method of claim 10, wherein the computer presenting the selected text in association with an indicator comprises:

the computer presenting the selected text in a selected color.

13. The method of claim 9, wherein the identification information further includes a set of checksums, wherein the set of checksums provides information to locate each text block in the set of text blocks within the web page, and further comprising:

the computer identifying each text block within the web page that matches a particular checksum in the set of checksums contained in the identification information to form a set of identified text blocks; and the computer to uniquely identifying a location of the each text block in the set of text blocks containing the at least a portion of the selected text in the web page using the set of checksums.

14. The method of claim 13, wherein the computer identifying each text block within the web page that matches the particular checksum in the set of checksums contained in the identification information to form the set of identified text blocks comprises:

the computer determining whether a text block within the web page matches the particular checksum in the set of checksums such that any differences are within a selected threshold level;

if a match is present, the computer identifying the selected text within the text block; and the computer generating a notification that a modification has occurred in the text block.

15. A computer program product comprising one or more computer-readable, tangible storage devices, and computer-readable program instructions which are stored on the one or more storage devices and when executed by one or more processors, perform the method of claim 9.

16. A computer system comprising one or more processors, one or more computer-readable memories, one or more computer-readable, tangible storage devices, and program instructions which are stored on the one or more storage devices for execution by the one or more processors via the one or more memories and when executed by the one or more processors perform the method of claim 9.

17. A browser executing on a data processing system, the browser comprising:

a user interface, wherein user input selecting a section of text in a web page is received using the user interface;

a checksum system, wherein the checksum system generates, by a processing unit, a checksum including a unique identifier for each text block in a set of text blocks containing the section of text to form a set of checksums, wherein a text block is text that has block boundaries in a web page, and wherein block boundaries are a markup in a web page to separate one section of text from another section of text;

a character count system, wherein the character count system identifies, by a processing unit, boundaries for each text block in a set of text blocks containing the section of text, a distance from a boundary of a text block within the set of text blocks containing the section of text to text in the section of text, and a number of characters that are present in the section of text located within the text block for each text block in the set of text blocks; and a universal resource generator, wherein the universal resource generator generates, by a processing unit, a universal resource located for the web page, wherein the universal resource locator includes information from the checksum system and the character count system used to present the web page at a location containing the section of text.

18. The browser of claim 17 further comprising:

a frame detection system, wherein the frame detection system provides generates, by a processing unit, an identification of a frame to the universal resource generator to include in the universal resource locator if any text in the section of text is located in the frame.

19. A computer program product for processing a web page, the computer program product comprising:

one or more computer-readable, tangible storage devices;

program instructions, stored on at least one of the one or more storage devices, to receive a selection of a section of text in a web page to form selected text;

program instructions, stored on at least one of the one or more storage devices, to identify a set of text blocks in the web page containing the selected text;

program instructions, stored on at least one of the one or more storage devices, to identify, for each text block in the set of text blocks containing at least a portion of the selected text, block boundaries of the text block that separate two or more sections of text within the web page, a distance from a block boundary of the text block to text in the selected text, and a number of characters that are present in the at least a portion of the selected text within the text block;

program instructions, stored on at least one of the one or more storage devices, to generate identification information for the selected text, wherein the identification information includes: an identification of the selected text, a location of the selected text in the web page; and, for each text block in the set of text blocks containing the at least a portion of the selected text, the distance from a block boundary of the text block to text in the selected text and the number of characters that are present in the at least a portion of the selected text within the text block; and program instructions, stored on at least one of the one or more storage devices, to place the identification information into a universal resource locator for presenting the web page in a browser at the location of the selected text.

20. The computer program product of claim 19, wherein the program instructions to generate identification information for the selected text create a checksum for the selected text, wherein the checksum provides information for the location of the selected text in the web page.

21. The computer program product of claim 19, wherein the program instructions to generate identification information for the selected text determine whether any text in the selected text is located within a frame and include an identification of the frame in the identification information if the any text is located within the frame.

22. The computer program product of claim 19, wherein the program instructions to generate identification information for the selected text create a checksum for each text block in the set of text blocks containing the at least a portion of the selected text to form a set of checksums, wherein the set of checksums provides information to locate each text block in the set of text blocks within the web page; and include the set of checksums in the identification information for the selected text.

23. The computer program product of claim 22, wherein the program instructions to generate identification information for the selected text determine whether any text in the selected text is located within a frame and identify the frame if the any text is located within the frame.

24. The computer program product of claim 22 further comprising program instructions, stored on at least one of the one or more storage devices, to present, responsive to user input selecting the universal resource locator to present the web page, the web page at the location containing the selected text using the set of checksums to uniquely identify a location of each text each text block in the set of text blocks containing the at least a portion of the selected text in the web page.

25. The computer program product of claim 24, wherein the program instructions to present the web page at the location containing the selected text using the set of checksums to uniquely identify the location of each text each text block in the set of text blocks containing the at least a portion of the selected text in the web page identify every text block within the web page that matches a particular checksum in the set of checksums contained in the identification information to form a set of identified text blocks; identify the selected text within the set of identified text blocks using the identification information; and present the web page at the location containing the selected text.

26. A computer system for processing a web page, the computer system comprising:
one or more processors, one or more computer readable-memories, and one or more computer-readable, tangible storage devices;
program instructions, stored on at least one of the one or more storage devices for execution by at least one of the one or more processors via at least one of the one or more memories, to receive a selection of a section of text in a web page to form selected text;
program instructions, stored on at least one of the one or more storage devices for execution by at least one of the one or more processors via at least one of the one or more memories, to identify a set of text blocks in the web page containing the selected text;
program instructions, stored on at least one of the one or more storage devices for execution by at least one of the one or more processors via at least one of the one or more memories, to identify, for each text block in the set of text blocks containing at least a portion of the selected text, block boundaries of the text block that separate two or more sections of text within the web page, a distance from a block boundary of the text block to text in the selected text, and a number of characters that are present in the at least a portion of the selected text within the text block;
program instructions, stored on at least one of the one or more storage devices for execution by at least one of the one or more processors via at least one of the one or more memories, to generate identification information for the selected text, wherein the identification information includes: an identification of the selected text, a location of the selected text in the web page; and, for each text block in the set of text blocks containing the at least a portion of the selected text, the distance from a block boundary of the text block to text in the selected text and the number of characters that are present in the at least a portion of the selected text within the text block; and
program instructions, stored on at least one of the one or more storage devices for execution by at least one of the one or more processors via at least one of the one or more memories, to place the identification information into a universal resource locator for presenting the web page in a browser at the location of the selected text.

27. The computer system of claim 26, wherein:
the program instructions to generate identification information for the selected text create a checksum for the selected text, wherein the checksum provides information for the location of the selected text in the web page.

28. The computer system of claim 26, wherein:
the program instructions to generate identification information for the selected text determine whether any text in the selected text is located within a frame and include an identification of the frame in the identification information if the any text is located within the frame.

29. The computer system of claim 26, wherein:
the program instructions to generate identification information for the selected text create a checksum for each text block in the set of text blocks containing the at least a portion of the selected text to form a set of checksums, wherein the set of checksums provides information to locate each text block in the set of text blocks within the web page; and include the set of checksums in the identification information for the selected text.

30. The computer system of claim 29, wherein:
the program instructions to generate identification information for the selected text identify the frame if the any text is located within the frame.

31. The computer system of claim 29 further comprising:
program instructions, stored on at least one of the one or more storage devices for execution by at least one of the one or more processors via at least one of the one or more memories, to present the web page at the location containing the selected text using the set of checksums to uniquely identify a location of each text each text block in the set of text blocks containing the at least a portion of the selected text in the web page in response to user input selecting the universal resource locator to present the web page.

32. The computer system of claim 31, wherein:
the program instructions to present the web page at the location containing the selected text using the set of checksums to uniquely identify the location of each text block in the set of text blocks containing the at least a portion of the selected text in the web page identify every text block within the web page that matches a particular checksum in the set of checksums contained in the identification information to form a set of identified text blocks; identify the selected text within the set of identified text blocks using the identification information; and present the web page at the location containing the selected text.

* * * * *